(No Model.) 2 Sheets—Sheet 1.
W. H. FARNHAM & C. B. ASKEW.
LIFE DETECTING AND PRESERVING APPARATUS.
No. 357,190. Patented Feb. 8, 1887.
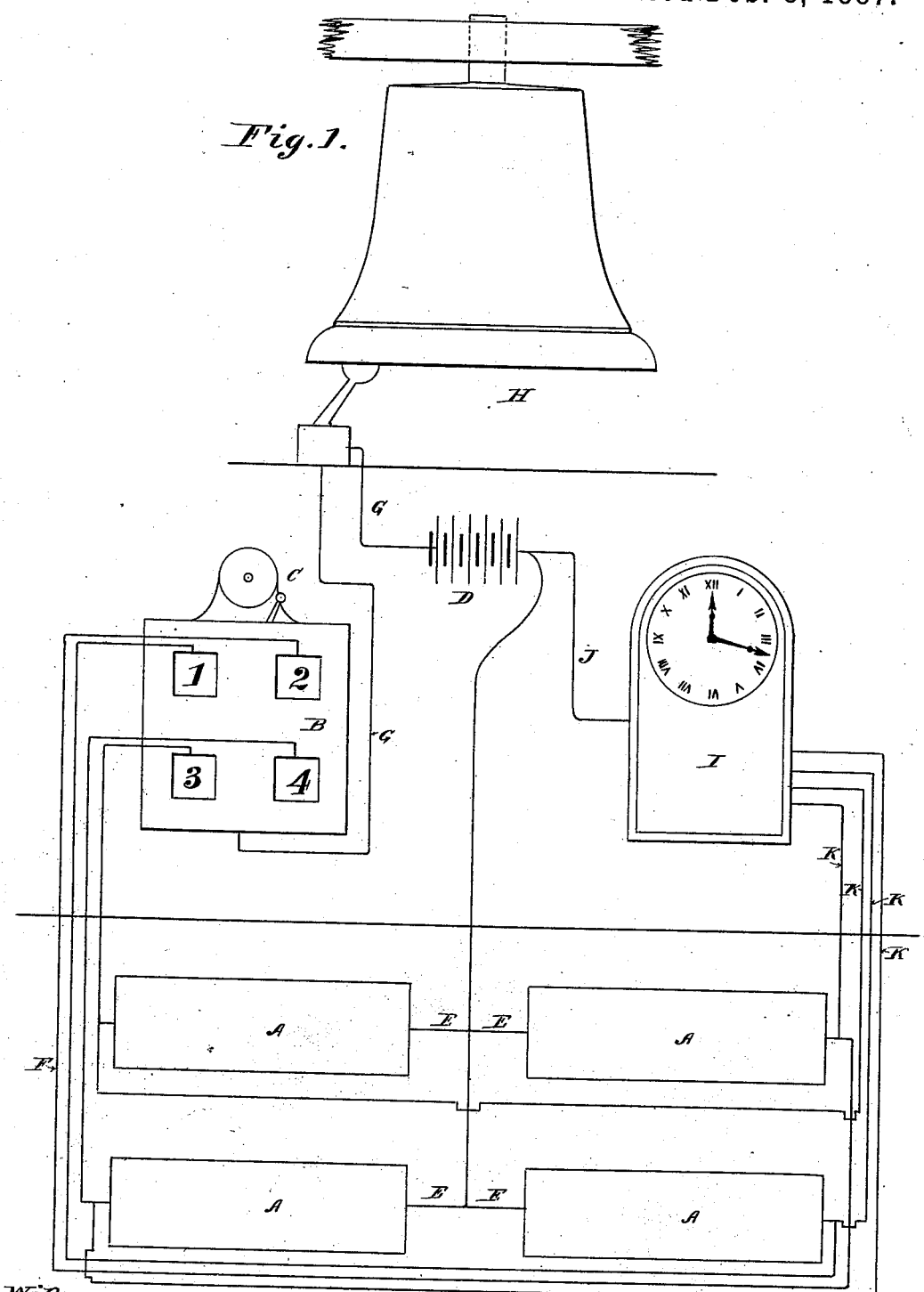

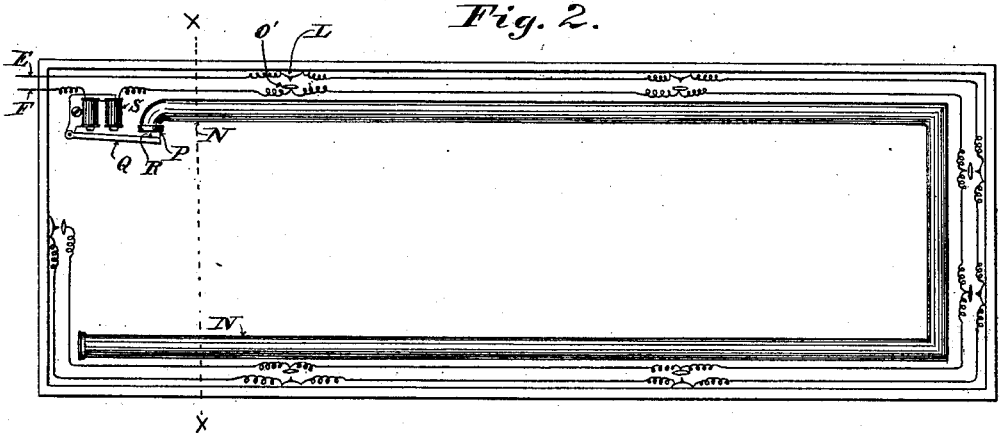
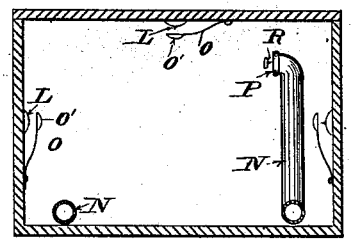
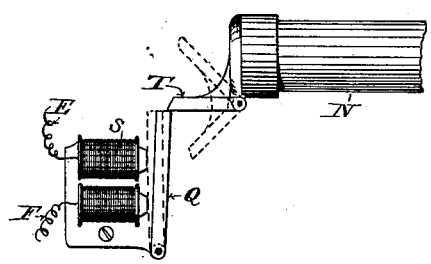
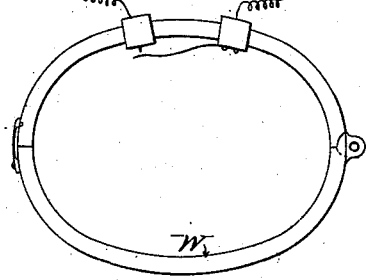

UNITED STATES PATENT OFFICE.

WILLARD H. FARNHAM, OF MINNEAPOLIS, AND CHARLES B. ASKEW, OF ST. PAUL, MINNESOTA.

LIFE DETECTING AND PRESERVING APPARATUS.

SPECIFICATION forming part of Letters Patent No. 357,190, dated February 8, 1887.

Application filed March 22, 1886. Serial No. 196,041. (No model.)

*To all whom it may concern:*

Be it known that we, WILLARD H. FARNHAM, of Minneapolis, in the county of Hennepin and State of Minnesota, and CHARLES B. ASKEW, of St. Paul, in the county of Ramsey and State of Minnesota, have invented a new and useful Life Detecting and Preserving Apparatus, of which the following is a specification.

The object we have in view is to provide an apparatus for use in connection with burial-caskets to operate an indicator or alarm, or both, in case there is any movement of the body contained in the casket, and to furnish a supply of air or life-preserving gas to any person who may have been placed therein in a state of suspended animation.

Our invention consists in an apparatus having one or more electric circuits, and an indicator and alarm located therein, with one or more burial-caskets, and make-and-break devices located in the caskets and connected with the circuit-wires and arranged to be operated by a movement of the body within the casket; also in an air or gas reservoir arranged in connection with said casket and operated by said circuit to furnish a supply of air or life-supporting gas to the body within the casket.

In the accompanying drawings, forming part of this specification, Figure 1 is a diagram showing the arrangement of our apparatus. Fig. 2 is a plan view of a casket with the top removed. Fig. 3 is a section on line $x\ x$ of Fig. 2, with the top in position. Fig. 4 is a detail of a modified construction of the reservoir-opener. Fig. 5 is a detail.

In the drawings, Fig. 1, A A represent a series of graves or vaults.

B represents an indicator having a series of numbers corresponding with the graves or vaults.

C is an alarm, preferably connected with the indicator.

D is a battery from which a circuit-wire extends to all the caskets in the graves or vaults. A series of wires, F, extend from the caskets to the corresponding number of the indicator. The indicator is connected with the battery through a wire, G. This wire may extend directly from the indicator to the battery; or in some instances we prefer to provide an alarm-bell, H, which may be of large size, and is preferably located at some prominent place, where it is sure to attract attention, as on a tower, or on the top of the sexton's house. In Fig. 1 we have shown this bell with the wire G between the indicator and battery.

We also provide in some instances a circuit-testing device, I, which is connected with the battery by a suitable wire, J, and with each of the wires F by wires K. The construction of the casket that we prefer to employ with this apparatus is shown in Figs. 2 and 3. The caskets are each connected with the wire E and one of the wires F.

Located within the casket are one or more (preferably a series of) make-and-break devices, arranged so that when any movement takes place in the casket one or more of said devices will be operated to close the circuit and operate the indicator and alarm. These make-and-break devices, as shown, consist of a series of contact-points, L, projecting from the interior of the casket and composed of platinum or other non-corrodible metal, and a series of contact-springs, O, having suitable buttons, O', of wood or other material, that are arranged opposite the points L. The points L are all connected with the wire E, and the springs O are all connected with the wire F. When a series of these make-and-break devices are used at various points on the casket-walls, it is practically impossible for any movement of the body in the casket to take place without some of these devices being operated. When one or more of the springs are brought in contact with the opposite contact-point, the circuit is closed and the indicator and alarm are operated. We also prefer to provide the casket with a tube or reservoir, N, that is filled with compressed oxygen, air, or other gas, and provided with means for opening it and permitting the gas to escape into the casket when the circuit is operated. This reservoir may be formed as a U-shaped tube extending around inside the lower part of the casket and having an upturned end, as shown in Fig. 2. The reservoir may, however, be of any other suitable shape, and arranged in any suitable manner. The tube is provided with a valve or diaphragm that closes the mouth thereof, and suitable mechanism is arranged in connection therewith, to be operated by the electric current and open the reservoir. Both ends of the tube may be turned to bring them into position near the face of the body in the casket. As shown in Figs. 2 and 3, the end of the tube is covered by a membrane, P, and a hinged bar, Q, carrying a stylus, R, is arranged in front thereof. An electro-magnet, S, is connected with one of the circuit-wires, and is arranged to move the bar Q when the current traverses its coils. A hinged valve, T, may be arranged to close the mouth of the reservoir, and be held in a closed position by the bar Q. When the circuit is closed, the bar is drawn away from the valve, which then opens by gravity and allows the air or gas to escape to the casket.

In Fig. 5 we have shown a band, W, having one of the contact-points L and contact-springs O arranged upon its inner side and connected with the wires E F. This band is adapted to be placed around the wrist of the body that is placed in the casket, with the spring directly over the pulse. In case there is any movement of the pulse, the spring will be brought in contact with the point and the indicating device will be operated. This device may be used in addition to the devices that are applied to the casket itself.

This apparatus may be used with caskets before burial, or with caskets in vaults or tombs, or with caskets that have been interred in the usual way. The casket itself may be of any ordinary construction, and any ordinary indicator and alarm may be employed. The indicator and alarm may be used together, or either may be used without the other; or other suitable indicating devices may be used.

Instead of being a reservoir the tube may communicate with the open air, so that when the valve is opened air from outside may enter the casket.

The apparatus may be used with a single casket; or any number of graves or vaults in a cemetery may be connected with it.

We have shown the apparatus arranged with open circuits that are closed by the make-and-break devices in the casket; but closed circuits may be used instead, in which case the springs will open the circuits when there is any movement in the casket.

We claim as our invention—

1. The combination, with an indicator and alarm, of a series of burial-caskets, means for supplying air or gas to the caskets, electric circuits connecting each of said caskets with the indicator, and one or more make-and-break devices in each of said caskets, whereby when any movement occurs in any casket the alarm is sounded, and the number of the grave, vault, or tomb is shown on the indicator, as set forth.

2. The combination, with a series of burial-caskets, of an electric circuit, an indicator in the circuit and connected with the several caskets, substantially as set forth, to designate in which casket the circuit is closed, make-and-break devices arranged within said casket, a gas or air supplying tube opening into said casket, and a tube-opener operated by said circuit, substantially as described.

3. The combination, with an indicating device, of an open electric circuit, a burial-casket, and a series of make-and-break devices on the inner walls of said casket, each independently connected with the wires of said circuit and adapted when any of said devices are brought together to close the circuit and cause the indicating device to be operated, for the purpose set forth.

4. The combination, with the indicating device and electric circuit, of the casket, the series of make-and-break devices within said casket connected with the wires of said circuit, a gas-reservoir arranged to supply gas to the interior of said casket, and a reservoir-opener located in and operated by said circuit, for the purpose set forth.

5. The casket having the series of stationary contact-points L secured upon its inner walls, and the opposite series of contact-springs, O, also secured upon said walls and adapted to be moved against said springs, in combination with the indicator, and the electric circuit connected with all of said points and springs, whereby when any one of said springs is brought against the opposite point the circuit is closed and the indicator operated, substantially as described, and for the purpose set forth.

6. The combination, with a burial-casket, of a reservoir of compressed oxygen arranged therein, an electric circuit, make-and-break devices in said casket, and a reservoir-opener operated by said circuit, for the purpose set forth.

7. The combination, with the indicator and alarm, of the casket, the series of contact-points upon its inner surface, the opposite contact-springs, the connecting circuit-wires, the tube, the electro-magnet connected with said circuit-wires, and the tube-opener adapted to be operated thereby, for the purpose set forth.

In testimony whereof we have hereunto set our hands this 19th day of March, 1886.

WILLARD H. FARNHAM.
CHARLES B. ASKEW.

In presence of—
A. C. PAUL,
R. H. SANFORD.